(12) United States Patent
Ishikawa (10) Patent No.: US 6,557,445 B1
(45) Date of Patent: May 6, 2003

(54) TOOL HOLDER AND A RUNOUT CORRECTING TOOL FOR A TOOL HOLDER

(75) Inventor: Hitoshi Ishikawa, Takahama (JP)

(73) Assignee: NT Tool Kabushiki Kaisha (JP)

( * ) Notice: Subject to any disclaimer, the term of this patent is extended or adjusted under 35 U.S.C. 154(b) by 0 days.

(21) Appl. No.: 09/649,818

(22) Filed: Aug. 28, 2000

(30) Foreign Application Priority Data

Aug. 30, 1999 (JP) ............................................ 11-242768

(51) Int. Cl.$^7$ ............................ B32B 27/00; B32B 29/00
(52) U.S. Cl. ............................ 82/158; 82/161; 82/903; 407/9; 407/10; 408/156
(58) Field of Search .......................... 82/158, 161, 151, 82/152, 173, 903; 407/8, 37, 38, 36, 44, 77, 71, 87, 88, 9, 10; 409/232, 233, 234; 408/156

(56) References Cited

U.S. PATENT DOCUMENTS 4,428,704 A * 1/1984 Kalokhe ..................... 408/156
4,775,268 A * 10/1988 Michalon ....................... 407/9
5,150,995 A * 9/1992 Reinauer
5,443,275 A * 8/1995 Knobl et al.
5,915,896 A * 6/1999 Koczarski et al. .......... 409/131
5,997,012 A * 12/1999 Brian
6,260,002 B1 * 7/2001 Ishii ........................... 702/168

FOREIGN PATENT DOCUMENTS

| JP | 60-104624 | * | 6/1985 |
| JP | 9286101 | | 1/1997 |
| JP | 10-113805 | * | 5/1998 |

* cited by examiner

Primary Examiner—Henry W. H. Tsai
(74) Attorney, Agent, or Firm—William A. Drucker (57) ABSTRACT

The invention relates to a tool holding assembly with an adjustment means capable of causing the tool holding end of the assembly to bend in relation to the opposite attachment end of the assembly. This is accomplished by providing first and second contact surfaces longitudinally spaced from each other along the assembly, and providing an adjustment means having at least one adjustment screw, wherein by adjusting the screw, pressure can be simultaneously applied by the adjustment means onto the first and second contact surfaces, such that an axis of one end of the assembly can be displaced by bending in relation to the other.

11 Claims, 10 Drawing Sheets

TOOL HOLDER AND A RUNOUT CORRECTING TOOL FOR A TOOL HOLDER

FIELD OF THE INVENTION

The present invention relates to a tool holder which is used with being attached to a rotary part of a working machine, and more particularly to a tool holder which is used with attaching the basal side of a shaft of the tool holder to a rotary part of a working machine, which has a holding portion for holding a tool such as a cutting tool, in the tip end side of the shaft, and which can correct runout of a tip end portion of the tool such as a cutting tool attached to the holding portion.

BACKGROUND OF THE INVENTION

When a hole is to be opened in a workpiece or the inner face of a hole is to be ground by using a working machine or the like, a tool such as a cutting tool is attached to the tip end side of a tool holder mounted on a rotary part of the working machine. The tool in the tip end side of the tool holder is rotated at a high speed by rotating the rotary part of the working machine, whereby desired working can be performed on the workpiece for a short time period.

As described above, the tool holder is used in a high speed state. When the tip end of the tool attached to the tip end of the tool holder deflects even at a small degree as a result of the high speed rotation, there arises a problem in that the dimensional accuracy of the hole is lowered or the inner peripheral face of the hole is roughened to disable the hole from being accurately worked.

In order to solve the problem, conventionally, means for correcting vibrations of a shaft of a tool holder is disposed on the tool holder (see Japanese published unexamined Patent application No. 11-104931).

Figure 12:
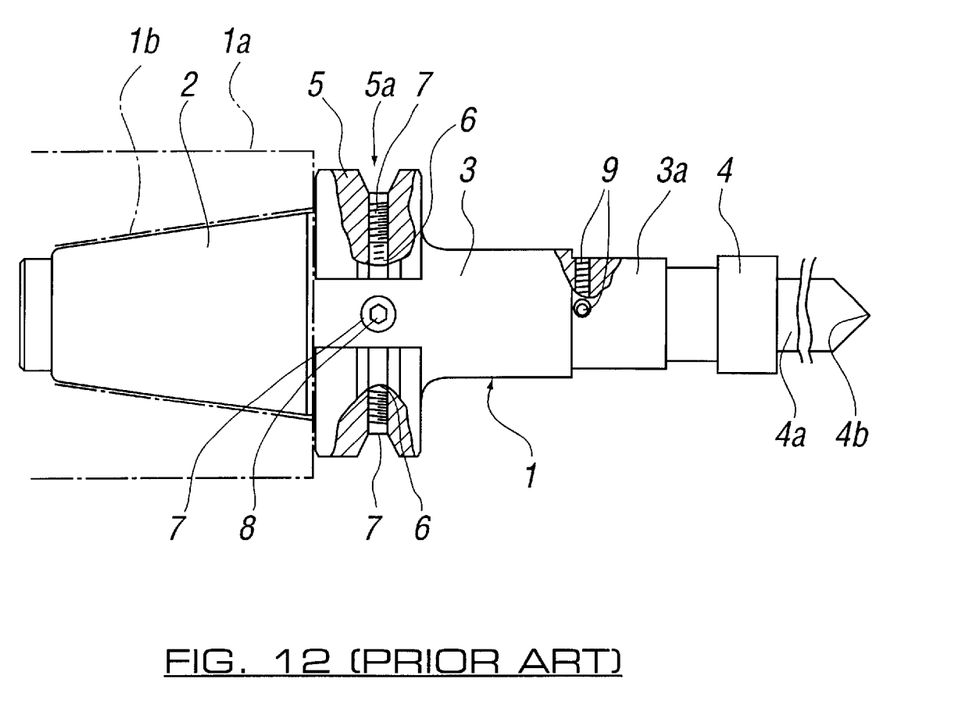
FIG. 12 is a view illustrating a runout correcting tool of the conventional art.

FIG. 12 shows the conventional art example. With reference to the figure, the conventional art example will be described. In a tool holder 1, the basal side 2 of a shaft 3 is formed as a shank portion 2 which is tapered as well known in the art, in order to fit the basal side into a tapered hole 1b of the main shaft 1a of a working machine which is not shown and has a well-known configuration. A holding portion 4 for a tool 4a is disposed in the tip end side of the shaft 3. (Usually, in order to fasteningly fix the tool 4a an example of which is a cutting tool such as a drill, a chuck 4 having a clamping hole which is expandable and contractable is disposed as the holding portion 4. In a well-known configuration, the cutting tool 4a may be attached directly integrally to the shaft 3 in the position of the chuck 4.) A large-diameter flange 5 which is used in the case where a grasping operation is to be performed by a grasping portion of a robot as well known in the art is formed on the outer periphery of the shaft 3 and on the side of the shank portion 2. The reference numeral 5a denotes a groove for engagement.

In the tool holder 1 shown in FIG. 12, plural radial holes 6 are threadedly formed in a bottom of the groove 5a of the flange 5, and a male screw 7 which is a screw member serving as a mass is screwed into each of the holes 6. A hexagonal hole 8 for a hexagonal wrench is formed in the head of each of the male screws 7. Each male screw 7 is adjusted so as to advance or retract in the corresponding hole 6 by using a wrench, so that, when the tool holder 1 is rotated at a high speed, the positional change in a radial direction appears as a change of the mass, whereby vibrations of the shaft 3 of the tool holder 1 can be corrected.

Even when vibrations of the shaft are corrected in a portion of the shaft 3 of the tool holder 1 the shaft center may sometimes deflect in a position closer to the tool attaching portion 4 in the tip end. Therefore, male screws 9 which similarly serve as a mass are attached to a tip end portion 3a so as to be advanceable and retractable, so that vibrations of the shaft in the tip end portion 3a can be corrected by advancing or retracting each of the male screws 9.

In the conventional art described above, however, the means for correcting vibrations of a shaft can correct vibrations of the shaft, only in a place where the correcting means is disposed and in the vicinity of the place.

In the case of a long tool such as a drill 4a which protrudes by a large distance from the tool attaching portion 4, the portion where correction of runout of the shaft center with respect to the rotation center is required at the highest degree is a blade edge 4b which is in the tip end of the drill. In the conventional art described above, however, it is impossible to correct runout of the shaft center with respect to the rotation center in a portion which largely protrudes from the tool attaching portion 4, such as the blade edge 4b in the tip end of the drill.

BRIEF SUMMARY OF THE INVENTION

It is an object of the invention to provide a tool holder having runout correcting means for displacing an axis C of a tip end side of a shaft by a simple operation of rotating a screw member for pressurizing a part of the shaft, whereby a center of a tip end of a tool attached to a protruding tip end portion is made coincident with the rotation center Ca of the tool holder.

It is another object of the invention to provide a tool holder in which a screw member for displacing the axis C of the tip end side of a shaft is disposed in at least three or more uniform positions in the periphery of the main shaft of the tool holder, whereby, even when the shaft center of a cutting tool serving as a tool deflects in any direction, the tip end of the cutting tool can be moved to the rotation center of the tool holder irrespective of the direction.

It is a further object of the invention to provide a tool holder in which, even in a case where a screw member is disposed in one place, the position of the tip end of the cutting tool can be freely changed in either of leftward and rightward directions in accordance with the direction of rotation of the screw member.

It is a still further object of the invention to provide a runout correcting tool which is requested only to be attached to the periphery of a shaft of a tool holder that is already completed, whereby the tool holder can be changed to a tool holder having runout correcting means for displacing the axis C of the tip end side of the shaft to make the center of the tip end of a tool attached to a holding portion with largely protruding therefrom, coincident with the rotation center Ca of the tool holder.

Other objects and advantages will easily become apparent from the accompanying drawings and the following description relating to the drawings.

The invention has the following feature. A tool is attached to a holding portion at a tip end portion of a shaft. In the case where a drilling or cutting work is to be conducted, even when the position of the tip end of the tool is laterally shifted to deviate from the rotation center of a tool holder, a screw member is rotated to generate a force of displacing the axis of the tip end side of the shaft, between two contact portions of the tool holder, whereby the position of a blade edge of the tool can be easily moved toward the rotation center of the tool holder so as to coincide therewith. According to this configuration, it is possible to attain an effect that, in the case where a drilling or cutting work is to be conducted by rotating the tool holder at a high speed, precision working can be accurately performed.

BRIEF DESCRIPTION OF THE DRAWINGS

FIG. 2(C) is a section view taken along the line II—II of FIG. 1, and shows an example in FIG. 3 is an enlarged view of the runout correcting means shown in FIG. 1;

DETAILED DESCRIPTION

Hereinafter, an embodiment of the invention will be described with reference to the accompanying drawings.

Figure 1:
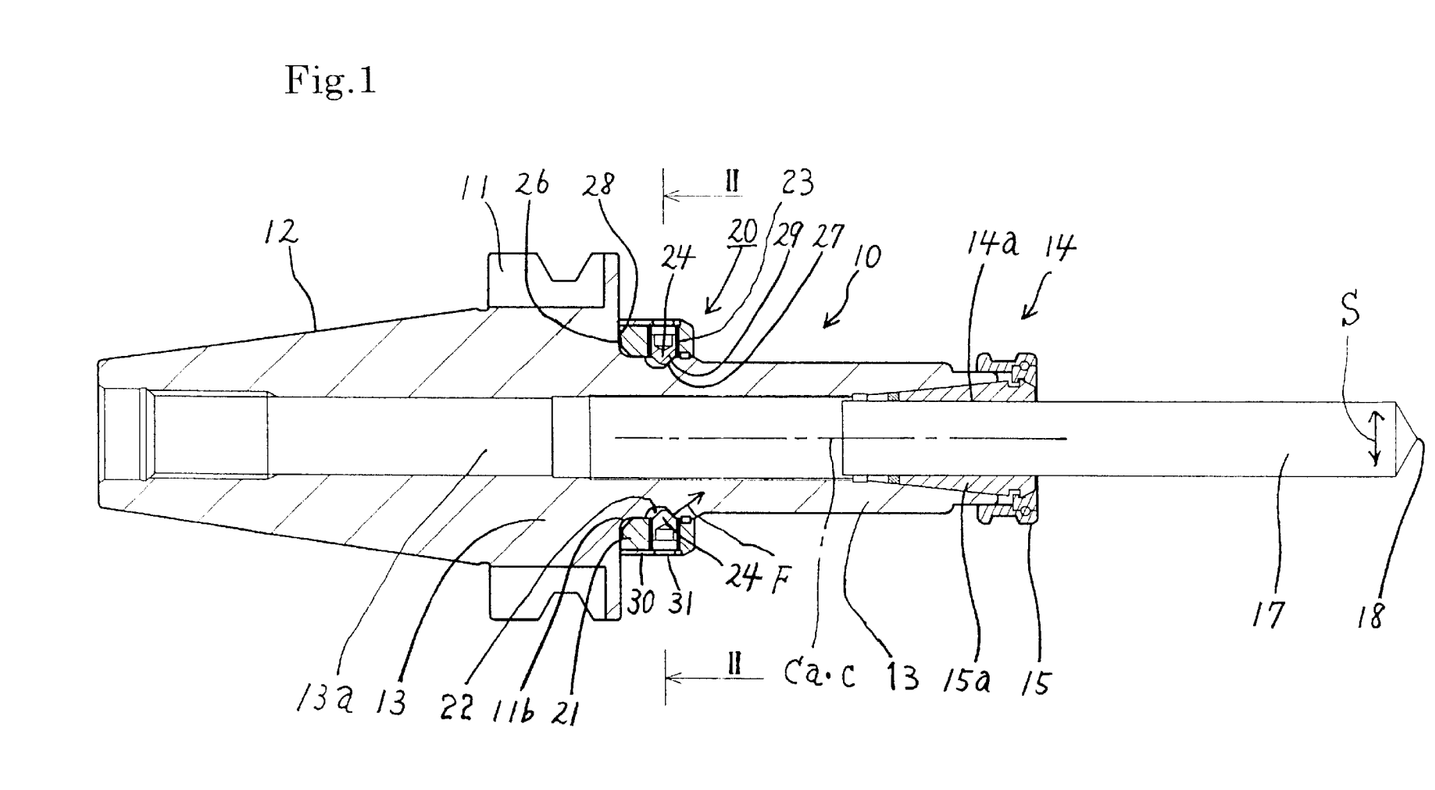
FIG. 1 is a section view of a tool holder having runout correcting means of an embodiment of the invention.
Figure 2A:
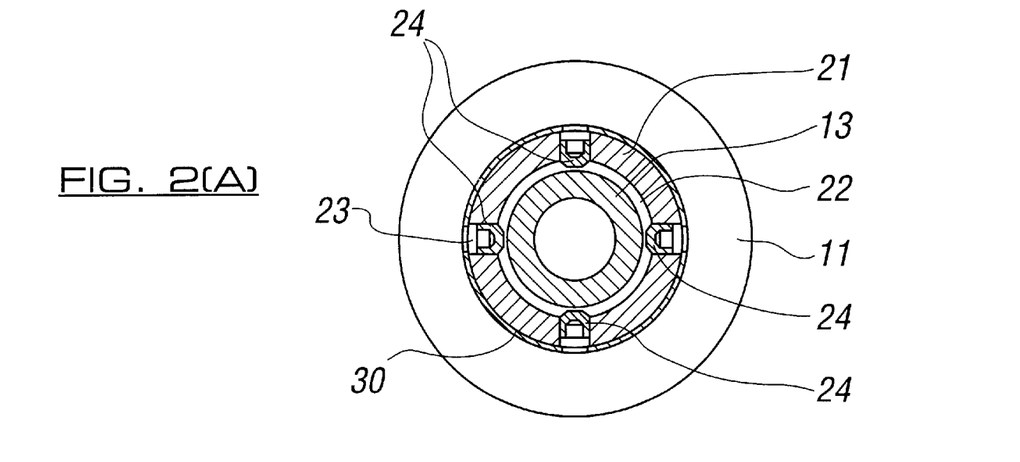
"FIG. 2(A) is a section view taken along the line II—II of FIG. 1, and shows an example in which a screw member is disposed in four places.
Figure 2B:
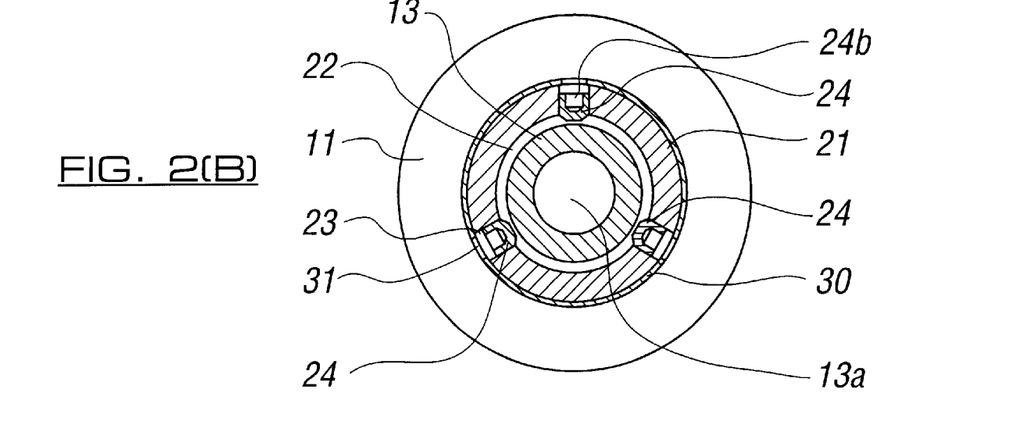
FIG. 2(B) is a section view taken along the line II—II of FIG. 1, and shows an example in which a screw member is disposed in three places.
Figure 2C:
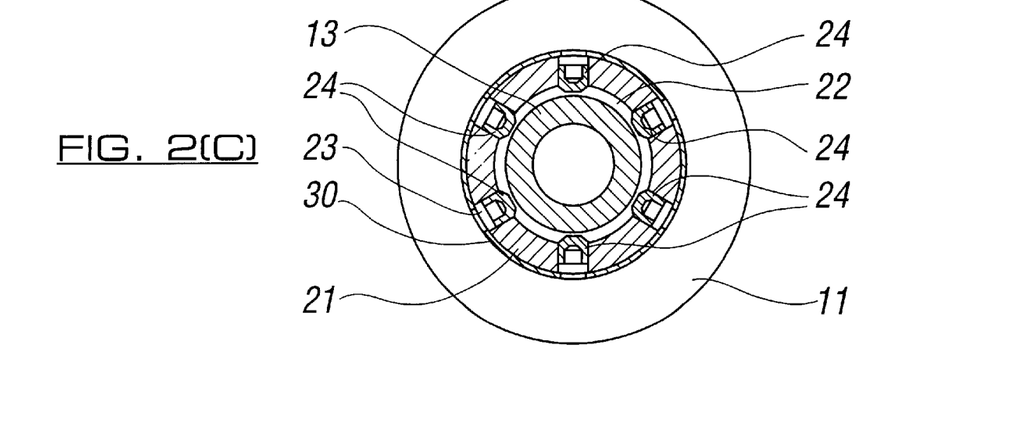
Figure 3:
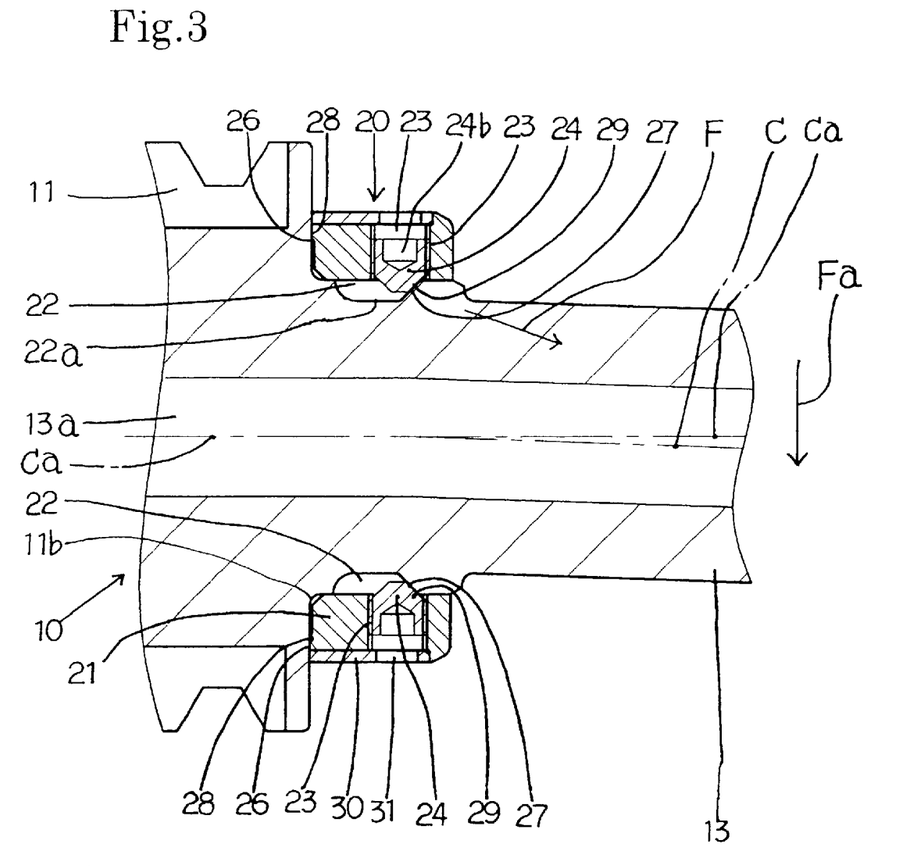

FIG. 1 is a section view of a tool holder 10 which is a first embodiment of the invention, and (A) of FIG. 2 is a section view taken along the line II—II of FIG. 1. In FIG. 2, (B) and (C) are views showing examples in which the number of screw members 24 is changed. FIG. 3 is an enlarged view of the runout correcting means shown in FIG. 1.

Although a configurations of components denoted by reference numerals 10 to 18 in FIGS. 1 to 5 are well known in the same manner as a tool holder 1 shown in FIG. 12, the configurations will be described below. As well known in the art, the tool holder 10 comprises a shaft 13 having a hollow portion 13a serving as a main unit. A flange 11 is disposed on an outer periphery of the shaft 13. A tapered shank portion 12 which protrudes in a rearward direction or toward a basal portion is disposed in back of the flange 11. The portion 12 serves as an attaching portion which is to be attached to a rotary part of a working machine.

In a front position with respect to the flange 11, a diameter of the shaft 13 is very smaller than that of the flange 11 (occasionally, the shaft may be larger in diameter than the flange 11). A step 11b is formed in front of the flange 11. As well known in the art, the shaft 13 is formed into a slender hollow cylindrical shape (occasionally, the shaft may be solid). A holding portion 14 for holding a tool 17 is disposed in a tip end side of the shaft.

The holding portion 14 is a portion which is well known as a chuck, and as well known fasteningly fixes a basal portion of a drill 17 which is an example of a cutting tool inserted into a center hole 14a of the holding portion 14, by using a collet chuck 15a, a clamp ring 15, etc.

In the holding portion 14, the thickness as a whole is not even because of the thickness of the shaft in the holding portion 14, and production errors of the collet chuck (contract ring) 15a, the clamp ring 15, etc. As a result, a position of a tool tip end 18 is laterally shifted with respect to a rotation center Ca of the tool holder 10 to deviate from the rotation center Ca of the tool holder. When the drill 17 is rotated at a high speed under such a state, the blade edge 18 at the tip end of the drill 17 deflects. This state of runout is such a state that the blade edge 18 at the tip end of the drill 17 deflects in both a direction of an arrow S in FIG. 1 and a direction of depth in FIG. 1 when the blade edge 18 is rotated around the rotation center Ca centering around the center Ca. In such runout state, precision working becomes disabled.

In the embodiment, therefore, a runout correcting tool 20 is detachably disposed on the outer peripheral face of the shaft 13. The runout correcting tool 20 has a main unit which is made of a metal material having substantial thickness and weight, and which is configured as a ring-like member (annular member) 21 so as to be fittable onto the outer periphery of the shaft 13.

A screw member 24 is screwed advanceably and retractably with a tapped hole 23 which is formed from an outer periphery of the annular member 21 to an inner periphery. The screw member 24 configured by a male screw is passed by the whole length through the tapped hole 23 via a well-known operation groove disposed in a head 24b. Even when the tapped hole 23 with which the screw member 24 is screwed is formed only in one place of the periphery of the annular member 21, the tip end 18 of the tool 17 can be adjusted with respect to runout. However, it is preferable that such a tapped hole is formed in three or more places in a circumferential direction of the periphery of the shaft (see (B) and (C) of FIG. 2). When these holes are respectively formed in uniform positions, adjustment of "runout" of the center of the tip end 18 of the tool can be performed very easily and rapidly.

An abutting portion 28 which is to abut against a first contact portion 26 disposed in the outer periphery of the shaft 13 is formed on one side face of the annular member 21. The first contact portion 26 is formed in the step 11b. Namely, the one side face 28 of the annular member 21 is caused to abut against the front wall face 26 of the flange.

A tip end 29 of the screw member 24 can abut against a second contact portion 27 which is disposed in a position separated in the longitudinal direction from the first contact portion 26. The second contact portion 27 is configured by cuttingly forming an annular U-groove 22 in the outer peripheral face of the shaft 13.

The two contact portions (26 and 27) are pressurized by rotating the screw member 24 to generate a force F of displacing the axis C of the tip end side of the shaft 13, between the portions.

When the tip end portion 29 of the screw member is in press contact with the shaft 13, a reaction force of the shaft 13 causes the end face 28 of the annular member 21 and the side end face 26 of the flange 11 to be in press contact with each other, so that the annular member 21 and the shaft 13 are firmly fixed to each other. In the embodiment, as shown in FIG. 3, when the flange side end face 28 of the annular member 21 abuts against the end face 26 of the flange 11, i.e., in the press contact state in which the annular member 21 cannot be moved toward the flange 11, the through hole 23 is positioned so that its center is slightly deviated from a center 22a of the U-groove 22 toward the holding portion 14.

When the screw member 24 is screwed and the tip end portion 29 of the screw member enters the U-groove 22, therefore, the screw tip end portion 29 abuts against only the inclined face (second contact portion) 27 of the U-groove 22 on the side of the holding portion 14, and does not abut against an inclined face on the side of the flange 11. As a result, when the screw member 24 is screwed into the tapped hole 23 to perform a fastening operation, the screwing force (in FIG. 3, the force directed toward the shaft center C of the tool holder 10) is caused by the function of the inclined face 27 to have a force in the direction indicated by F in FIG. 3, i.e., a component of force which bends the portion of the shaft 13 on the side of the holding portion 14 in the direction of the arrow Fa.

The reference numeral 30 denotes an annular cover which is placed on the outer periphery of the annular member in order to prevent the screw member 24 from jumping out. An end portion of the cover is detachably fixed to the shaft 13. The reference numeral 31 denotes an operation hole which has a diameter smaller than the screw head 24b, and which is positioned in the outer peripheral side of the screw head 24b.

Figure 4:
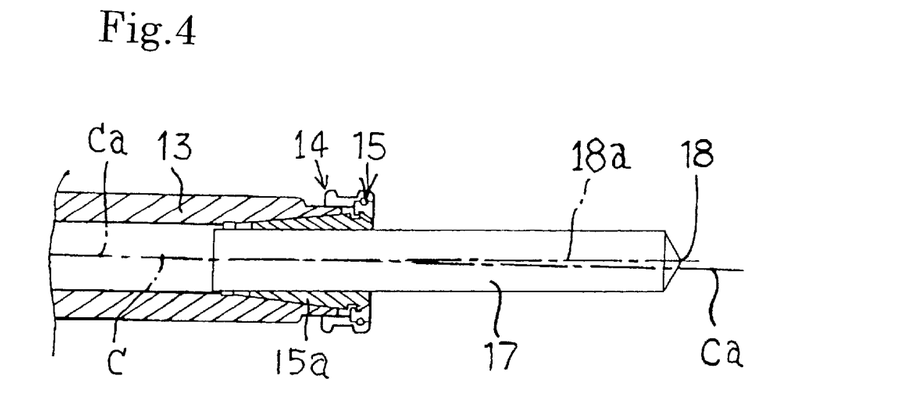
FIG. 4 is a partially cutaway view showing a state where a cutting edge of a tool deflects.
Figure 5:
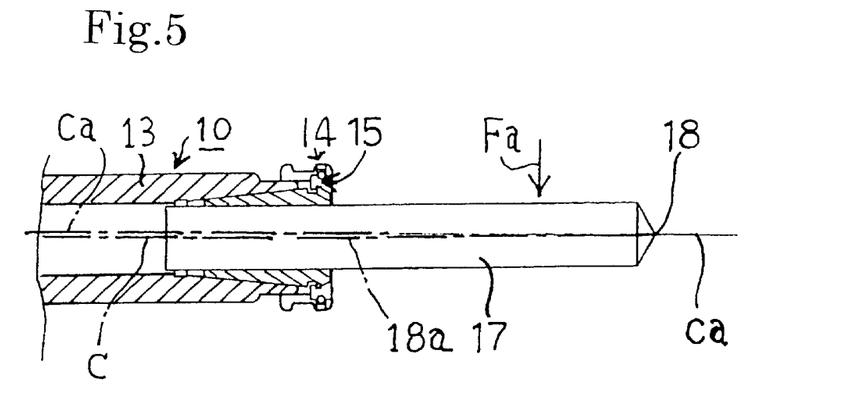
FIG. 5 is a partially cutaway view showing a state where the runout of the cutting edge is corrected.

In the case where the drill 17 is attached to the thus configured tool holder 10 and then rotated, when the position of the blade edge 18 of the drill deviates from the rotation center axis Ca as shown in FIG. 4, the center portion of the tip end 18 of the tool 17 is made coincident with the rotation center Ca of the tool holder. In this case, as shown FIGS. 3 and 5, the shaft 13 is bent by adjusting the fastening force (the press contacting force on the inclined face 27) of each of the three (or more) screw members 24 shown in FIG. 2, to displace the axis C in the direction of the arrow Fa, thereby making the position of the blade edge 18 coincident with the rotation center axis Ca.

In the tool holder of the conventional art shown in FIG. 12, even when a screw 7 of the correcting tool is fastened, only the mass which is immediately below the screw can be changed. Therefore, it is difficult to correct runout of the shaft center which occurs on the side of the drill with respect to a correcting place. By contrast, in the embodiment, the fastening force exerted on the screw 24 causes the shaft 13 to be bent, so that the force can be applied toward the holding portion 14 as the force F shown in FIG. 3. Therefore, runout between the rotation center of the tip end 18 of the tool and the rotation center Ca of the tool holder 10 can be easily corrected.

As described above, the runout correcting tool 20 of the embodiment can correct runout which occurs on the side of the tool 17 with respect to the correcting tool 20. This is realized by the function of the inclined face 27. When the inclination angle of the inclined face 27 is changed, the direction of the force F can be directed more closely to the drill. However, the necessary force (the force of fastening the screw 24) must be increased in accordance with the change.

Figure 6:
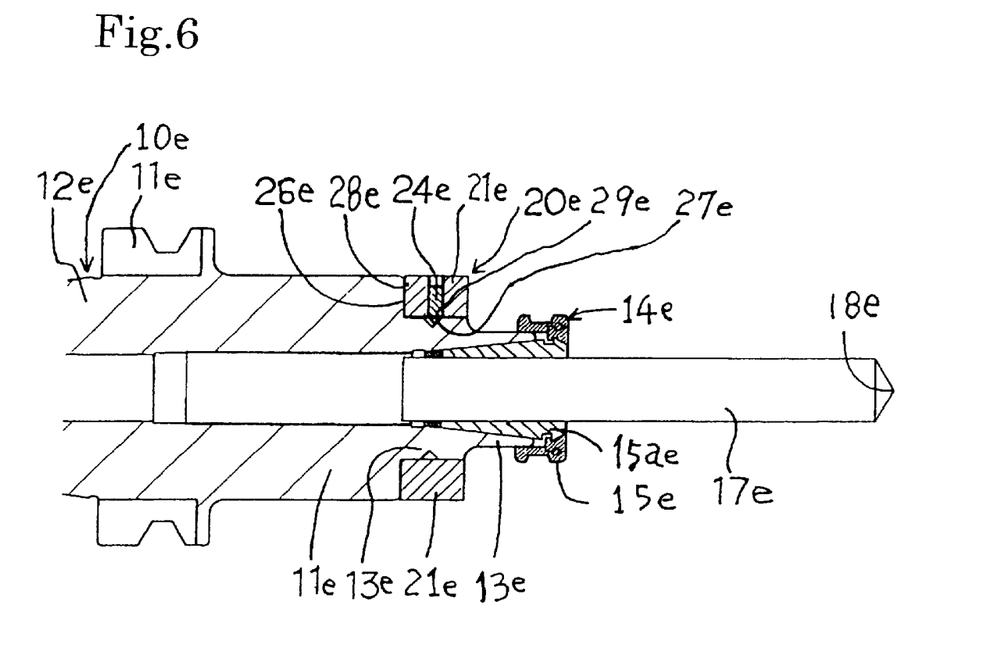
FIG. 6 is a partial section view showing runout correcting means of another embodiment; which a screw member is disposed in six places;"

FIG. 6 shows a tool holder 10 of a second embodiment of the invention in which runout of the blade edge 18 at the tip end of the drill can be corrected at a higher degree. The embodiment is different from the first embodiment in that the attaching position of the runout correcting tool 20 is set to be closer to the drill 17. When the runout correcting tool 20 is closer to the drill as described above, it is not required to reduce the inclination angle of the inclined face 27, and runout of the tip end 18 of the drill can be corrected by a smaller fastening force.

In the above description, the runout correcting means of the tool holder 10 shown in FIGS. 1 to 6 corrects "runout" of the tool holder 10 after the runout correcting tool 20 which is configured so as to be attachable and detachable with respect to the tool holder 10 is attached to the tool holder 10. As described above, the runout correcting means 20 may be an independent component which is detachably configured. Alternatively, the means may be configured by previously attaching the annular member 21 to the outer peripheral face of the shaft in a step of producing the tool holder 10.

In FIG. 6, components which seem to be functionally identical or equivalent to those of FIGS. 1 to 5 described above are denoted by the same reference numerals as those used in FIGS. 1 to 5, and letter "e" is affixed to the reference numerals in order to distinguish the numerals from those used in the figures. Therefore, the configuration of the components can be easily realized, and duplicated description is omitted. (Also in the configuration associated to partial views of FIG. 7 and the subsequent figures, components of the tool holder 10 to which the runout correcting tool 20 is attached are denoted by the same reference numerals as those of the previous figures, letter f or g is affixed, and duplicated description is omitted.)

In the above-described embodiment of FIGS. 1 to 6, one inclined face of the U-groove 22 is used as the second contact portion of the runout correcting tool 20. It is requested only that an engagement structure for receiving the second abutting portion 29 exists correspondingly and scatteringly in the circumferential direction of the shaft 13. The second contact portion is not required to be formed as a U-groove. In FIG. 3, the screw member 24 is opposed to the second contact portion 27. Alternatively, the U-groove 22 may be formed in the first contact portion 26, and the screw member 24 may be configured so as to be advanceable and retractable with respect to the U-groove. In the alternative also, the force F shown in FIG. 3 can be similarly generated.

Among the embodiments described above, the embodiment mode relating to the runout correcting means 20 may be configured as shown in FIGS. 7, 8, 9, 10, and 11. The runout correcting means 20 shown in the figures are embodiment modes which are configured in a partly different manner from the runout correcting means 20 shown in FIG. 3.

Figure 7A:
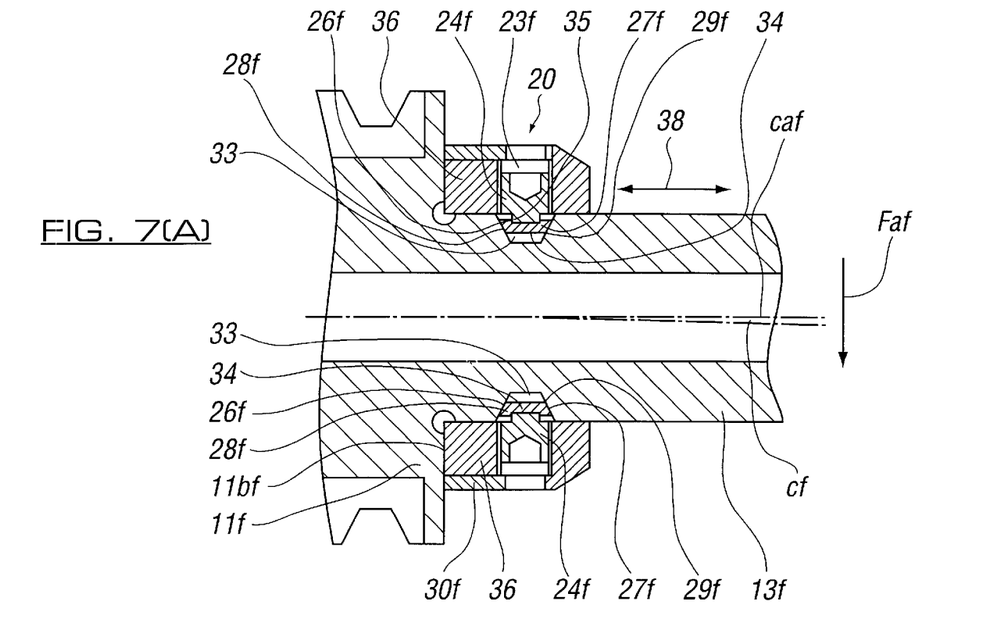
"FIGS. 7(A) and 7(B) are partial section views of a tool holder having runout correcting means of a further embodiment;"
Figure 7B:
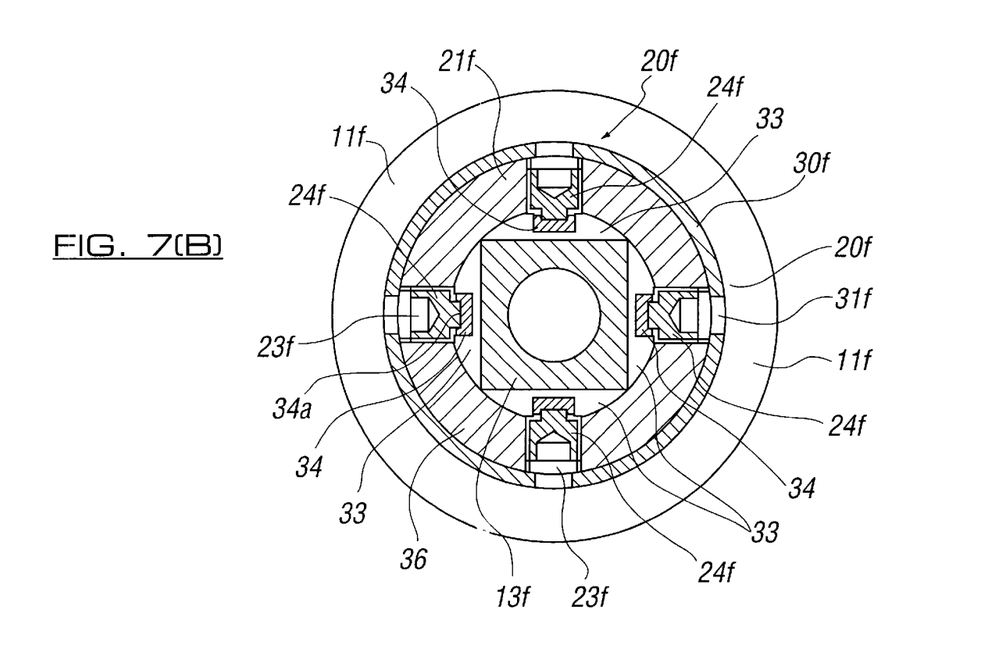

The object of the runout correcting means shown in FIG. 7 is to show a possibility that runout correcting means is disposed in an arbitrary intermediate position in the longitudinal direction of the shaft so as to enable the axis of the tip end side of the shaft 13 to be displaced.

Referring to FIG. 7, 33 denotes a trough-shaped recess portion which is disposed in an arbitrary intermediate position in a longitudinal direction 38 of the outer periphery of a shaft 13f. The recess is opened in front and rear portions. In the recess, inclined faces for configuring first and second contact portions 26f and 27f are formed in front and rear positions which are separated from each other in the shaft longitudinal direction 38, respectively. A pressing member 34 made of steel is disposed in the recess 33 so as to be advanceable and retractable toward the trough bottom. First and second abutting portions 28$f$ and 29$f$ which are correspondingly inclined so as to be in press contact with the inclined portions of the first and second contact portions are disposed in front and rear sides of the pressing member 34. A female screw forming portion 36 for advanceably and retractably holding a screw member 24$f$ is fixedly placed around the shaft. The female screw forming portions 36 may be arranged fixedly and independently around the shaft, at a number which is equal to the numbers of the recesses 33 and the corresponding screw members 24$f$. Alternatively, as illustrated, an annular member 21$f$ which is integrally formed may be placed around the shaft, and a desired number of female screw forming portions 36 may be disposed in the member. Alternatively, in the same manner as the U-groove 22 of FIG. 1, the trough-shaped recess portion 33 may be formed by cutting the outer peripheral face of the shaft 13 continuously and annularly. In the case where the trough-shaped recess portion 33 is formed by cutting the outer peripheral face of the shaft 13 continuously and annularly, when the annular member 21$f$ is movable in the shaft circumferential direction, the position of the female screw forming portion 36 in the circumferential direction can be changed so that the displacement direction of the axis Cf of a tip end side of the shaft 13$f$ can be arbitrarily changed. Therefore, the number of the screw members 24$f$ can be reduced. A recess 34$a$ is formed in the pressing member 34, and a tip end 35 of the screw member 24$f$ is loosely fitted into the recess.

In the runout correcting means 20 of FIG. 7, when the screw member 24$f$ is operated to advance the tip end 35 toward the shaft center, the pressing faces 28$f$ and 29$f$ on the both sides of the pressing member 34 press the inclined faces of the first and second contact portions 26$f$ and 27$f$ so that a distance between the inclined faces is lengthened, and, in the same manner as the case shown in FIG. 3, the force Ff of displacing the axis Cf of the tip end side of the shaft 13$f$ is generated.

Figure 8A:
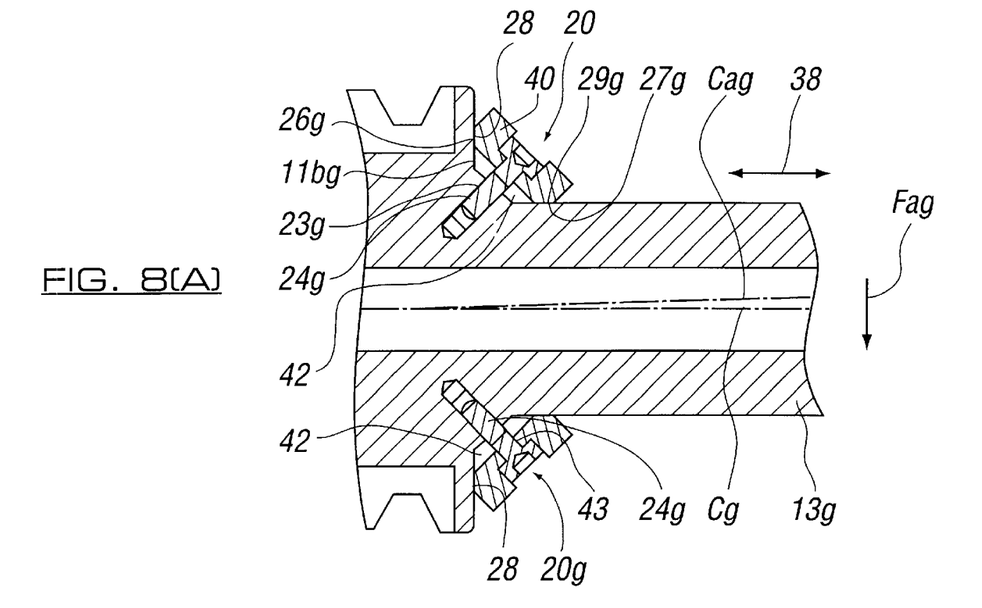
"FIGS. 8(A) and 8(B) are partial section views of a tool holder having runout correcting means of a still further embodiment;"
Figure 8B:
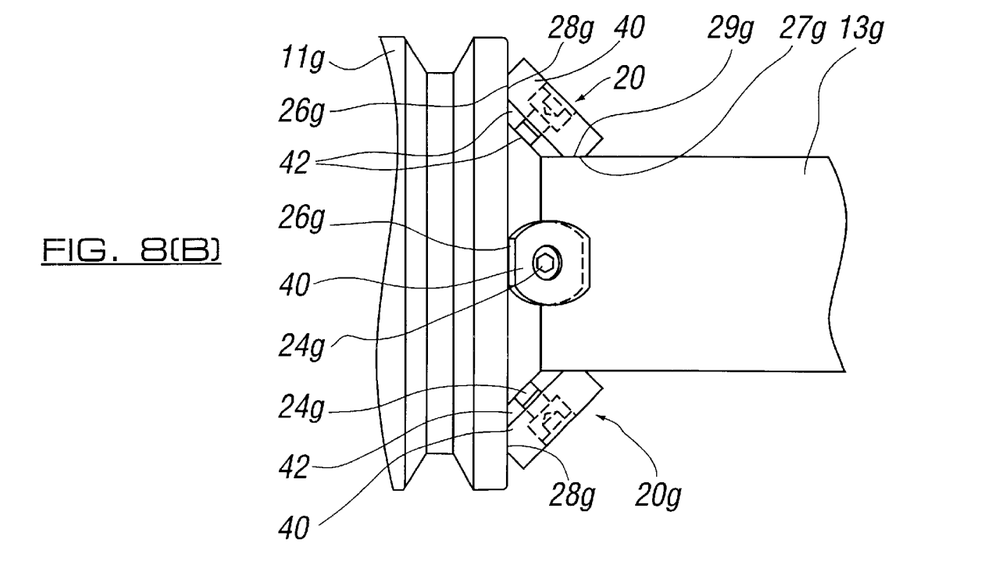

The object of provision of a runout correcting means shown in FIG. 8 is to show a possibility that the means can be easily attached to a conventional tool holder such as shown in FIG. 12 and facilitate displacement of the axis of the tip end side of the shaft.

Referring to FIG. 8, 11$bg$ denotes a step which is usually formed in an arbitrary intermediate position in a longitudinal direction 38 and in an outer periphery of a shaft 13$g$, and which, in positions separated from each other in the longitudinal direction 38, forms a rising wall face 26$g$ and a shaft outer peripheral face 27$g$ that is perpendicular to the wall face. The faces constitute first and second contact portions 26$g$ and 27$g$, respectively. A pressing member 40 made of steel is disposed in the step 11$bg$ so as to be advanceable and retractable toward a space in a corner 42. First and second abutting portions 28$g$ and 29$g$ which are formed as inclined abutting faces so as to be in press contact with the first and second contact portions 26$g$ and 27$g$ are disposed in front and rear positions of the pressing member 40.

A tapped hole 23$g$ is formed in the corner 42 of the shaft 13$g$. A screw member 24$g$ which is passed through a hole 43 of the pressing member 40 is screwed advanceably and retractably with the tapped hole. In the runout correcting means 20$g$ of FIG. 8, when the screw member 24$g$ is operated to advance the pressing member 40 toward the corner 42, the abutting faces 28$g$ and 29$g$ of the pressing member 40 press the abutting faces of the first and second contact portions 26$g$ and 27$g$ so that a distance between the abutting faces of the first and second contact portions 26$g$ and 27$g$ is lengthened, and, in the same manner as the case shown in FIG. 7, the force of displacing the axis Cg of the tip end side of the shaft 13$g$ is generated.

Figure 9A:
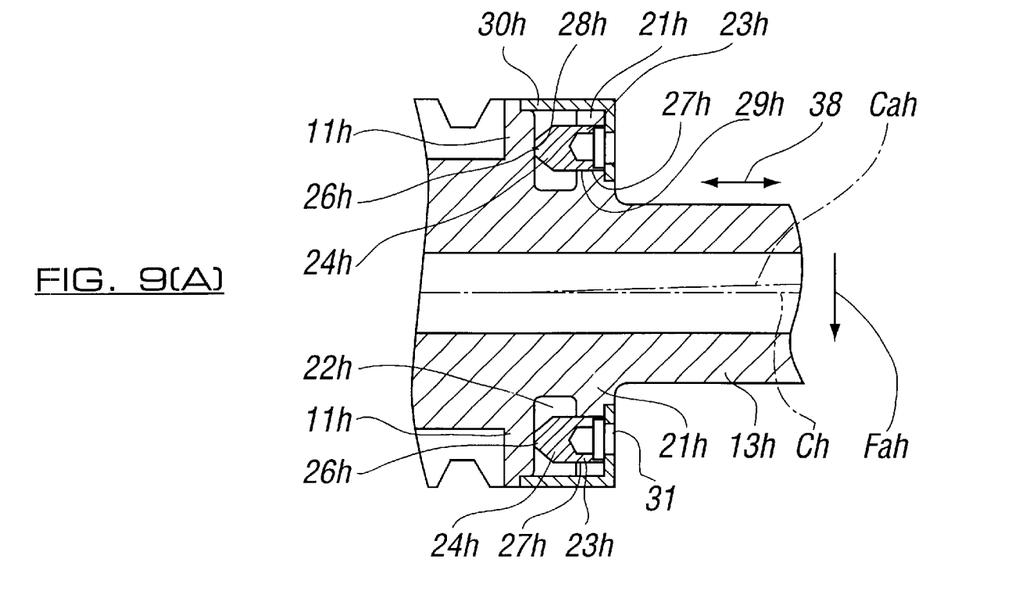
"FIGS. 9(A) and 9(B) are partial section views of a tool holder having runout correcting means of a still further embodiment;"
Figure 9B:
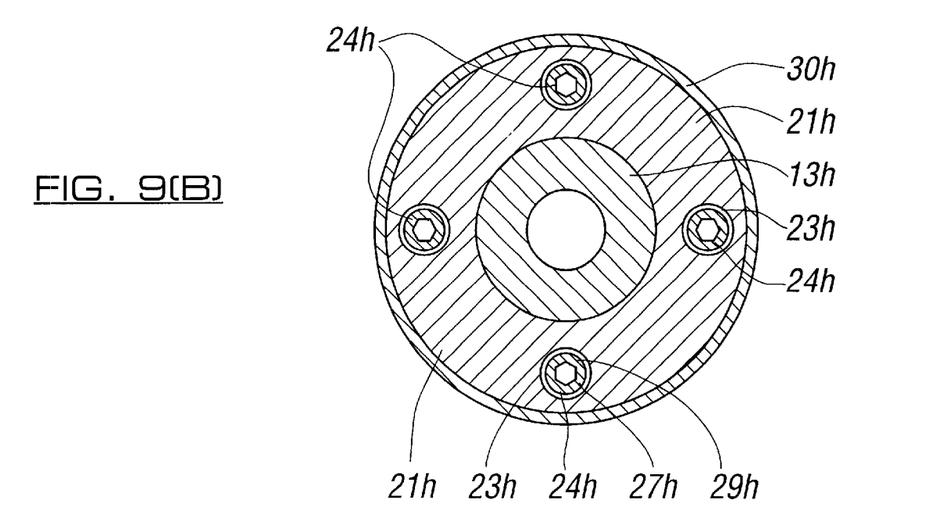
Figure 10A:
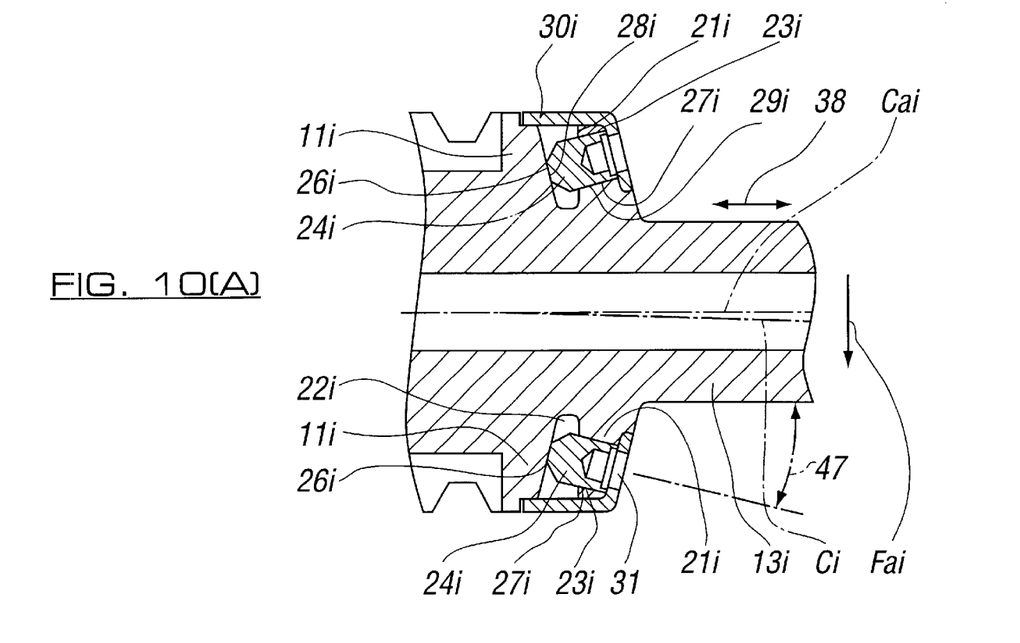
"FIGS. 10(A) and 10(B) are partial section views of a tool holder having runout correcting means of a still further embodiment;"
Figure 10B:
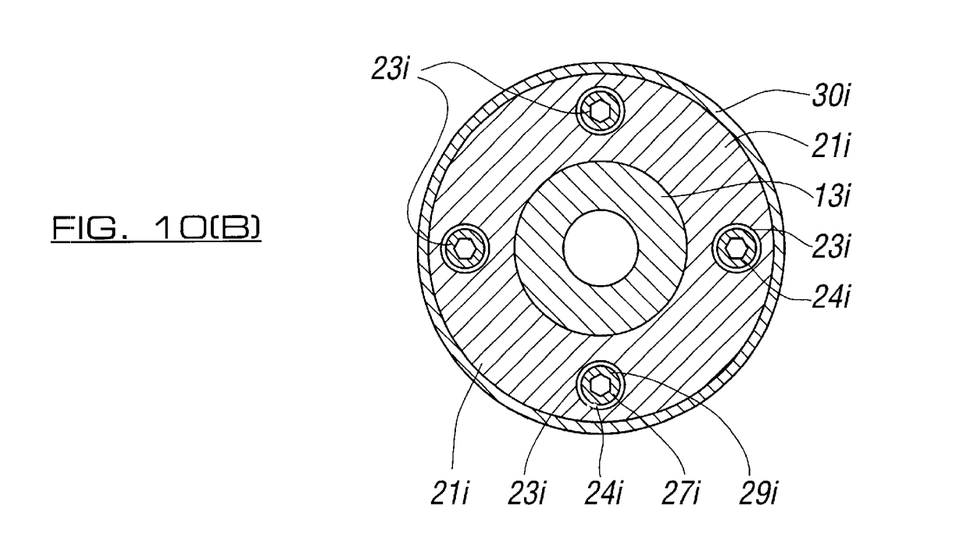

The object of provision of a runout correcting means shown in FIGS. 9 and 10 is to provide means for enabling the screwing force of a screw member to act very effectively on displacement of an axis of a tip end side of a shaft.

Referring to the figures, a rising wall face 26$h$ or 26$i$ constituting a first contact portion 26$h$ or 26$i$ uses a step formed in front of a flange 11$h$ or 11$i$ (or an annular member which is fixed to the shaft and separately formed). An annular member 21$h$ or 21$i$ which is formed fixedly with the shaft 13$h$ or 13$i$ by an integral member (or fixedly formed in a fittable manner by a separate member) is disposed in a position of the shaft which is separated in a longitudinal direction 38. In the annular member, a second contact portion 27$h$ or 27$i$ is configured by a female screw portion 23$h$ or 23$i$. A screw member 24$h$ or 24$i$ is screwed into the female screw portion 23$h$ or 23$i$. A tip end of the screw member is formed as a first abutting portion 28$h$ or 28$i$, and a basal portion of a thread portion of the screw member is formed as a second abutting portion 29$h$ or 29$i$.

According to this configuration, when the screw member 24$h$ or 24$i$ is operated, the gap between the rising wall face 26$h$ or 26$i$ and the member 21$h$ or 21$i$ having the female screw portion 23$h$ or 23$i$ is widened to generate a force of displacing the axis Ch or Ci of the tip end side of the shaft 13$h$ or 13$i$.

The axial direction of the screw member 24$h$ or 24$i$ in FIG. 9 or 10 may be se to be in parallel with the axis of the shaft 13$h$ as shown in FIG. 9, or may be inclined or provided with an angle 47 as shown in FIG. 10. Namely, the axial direction may be arbitrarily set so as to facilitate the operation of the member.

Figure 11A:
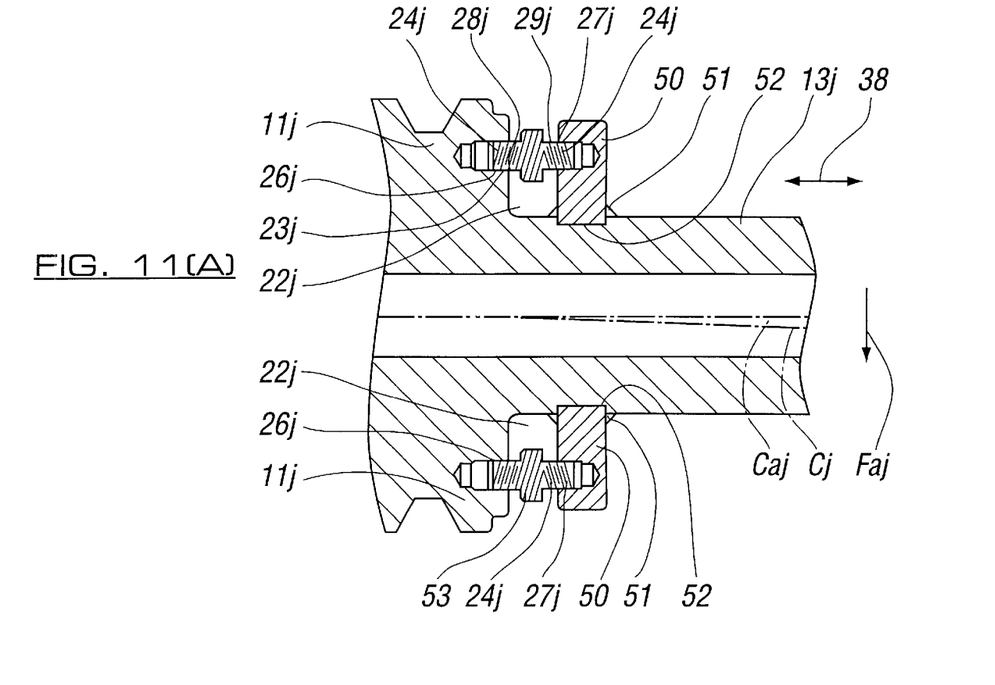
"FIGS. 11(A) and 11(B) are partial section views of a tool holder having runout correcting means of a still further embodiment.
Figure 11B:
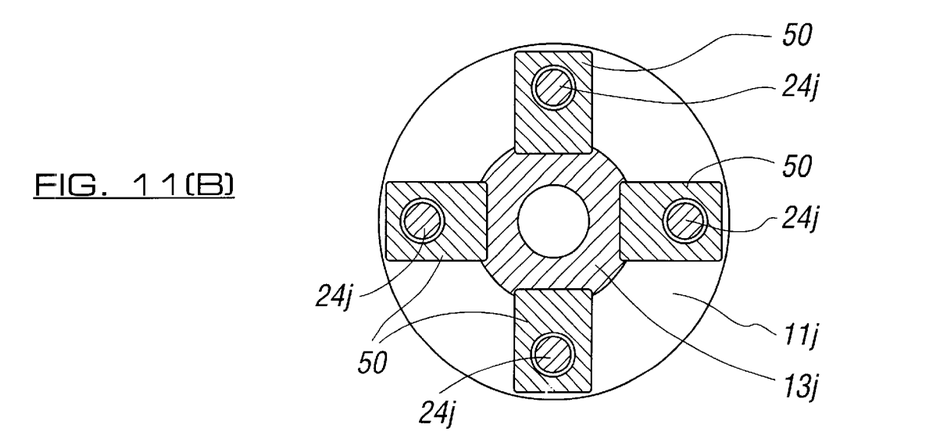

The object of provision of a runout correcting means shown in FIG. 11 is to generate a force which causes an axis of a tip end side of a shaft to be directed rightward or leftward or in different orientations depending on the direction of the operation of rotating a screw member.

Referring to FIG. 11, a left-hand female screw (or right-hand female screw) 23$j$ is formed in a rising wall face 26$j$ serving as a first contact portion 26$j$. In a screw holding member 50, a right-hand (or left-hand) female screw 23$j$ which is opposite in direction to the screw of the first contact portion 26$j$ is disposed in a position which is separated in a longitudinal direction 38 of the shaft 13$j$, as a second contact portion 27$j$. The screw holding member 50 may have an independent configuration such as a steel nut. In first and second abutting portions 28$j$ and 29$j$, a left-hand screw 28$j$ and a right-hand screw 29$j$ are formed in the both end sides of one screw member 24$j$, and the screws are screwed with left- and right-hand female screws formed in the first and second contact portions 26$j$ and 27$j$, respectively. The contact portions 26$j$ and 27$j$ are made closer to or separated from each other by leftward or rightward rotating the one screw member 24$j$, so that an axis Cj of the tip end side of the shaft 13$j$ can be directed rightward or leftward or in different orientations.

The embodiment is assembled in the following manner. The both sides of the screw member 24$j$ are screwed into the corresponding female screws, respectively. Under this state, the nut 50 which remains to be in a rotatable state is fixed to an outer periphery of the shaft 13$j$ by any means such as welding 51. The reference numeral 52 denotes a groove for fitting, and 53 denotes a rectangular member for operating the screw.

FIGS. 7, 8, 9, 10, and 11 show the examples in which four sets of the runout correcting means 20 are arranged in the periphery of the shaft 13. In the same manner as the first embodiment, the number of the means can be, for example, any number of 1 to 6, or arbitrarily set.

With respect to the runout correcting means 20 shown in the figures, the operation conducted on one set of the means has been described. When two, three, or more sets of the runout correcting means 20 which are arranged in the periphery of the shaft are alternatingly operated, the shaft center C can be bent and displaced in an arbitrary direction. For example, the position of the blade edge 18 of the drill 17 may be made closer to the rotation center Ca of the tool holder 10 so as to coincide therewith. Alternatively, an operation may be conducted so that the position of the blade edge 18 of the drill 17 is made remoter from the rotation center Ca to increase the cutting radius.

In each of FIGS. 7, 8, 9, 10, and 11 showing the specific configurations, (A) is a section view of the tool holder and taken at a position corresponding to FIG. 3, and (B) is a section view taken at the position of the runout correcting means 20 shown in (A).

As many apparently widely different embodiments of this invention may be made without departing from the spirit and scope thereof, it is to be understood that the invention is not limited to the specific embodiments thereof except as defined in the appended claims.

What is claimed is:

1. A tool holder having a shaft assembly with first and second ends, comprising:
    a support portion externally located on said assembly between said first and second ends, wherein said support portion has a first contact surface thereon positioned at a first predetermined angle, and wherein a second contact surface is located on said assembly between said support portion and said second end, and longitudinally spaced a predetermined distance from said support portion, wherein said second contact surface is positioned at a second predetermined angle that is different from said first predetermined angle; and
    at least one adjustment member positioned substantially between and against said first and second contact surfaces, said adjustment member having a screw adapted such that by adjusting said screw, pressure is applied simultaneously by said adjustment member against said first and second contact surfaces, wherein the pressure applied against said first and second contact surfaces causes an axis of said second end of said assembly to be displaced by bending in relation to an axis of said first end of said assembly.

2. The tool holder of claim 1, wherein said support portion comprises an annular extension on said assembly and said first predetermined angle is substantially perpendicular to a center axis of said assembly, and wherein said second predetermined angle is oriented 90 degrees or less in relation to said first predetermined angle.

3. The tool holder of claim 1, wherein said adjustment member has a first engaging portion for engaging said first contact surface, and a second engaging portion for engaging said second contact surface, wherein said first and second engaging portions are movable in relation to each other via adjustment of said screw.

4. The tool holder of claim 3, wherein said second predetermined angle is at an acute angle in relation to said first predetermined angle.

5. The tool holder of claim 1, wherein said adjustment member has a first engaging portion for engaging said first contact surface, and a second engaging portion for engaging said second contact surface, wherein said adjustment member is movable in relation to said assembly via adjustment of said screw.

6. The tool holder of claim 1, wherein at least three adjustment members are disposed in uniform fashion in a circumferential manner around said assembly.

7. A tool holder having a shaft assembly with first and second ends, comprising:
    first and second support portions located on said assembly longitudinally spaced apart from each other, and intermediate of said first and second ends, wherein said first support portion has a first bore with threads extended in a first direction, and said second support portion has a second bore with threads extended in a second direction opposite said first direction;
    a screw member for engaging and being positioned between said first and second bores, wherein said screw member has a first end having threads that engage said first bore, and a second end having threads that engage said second bore; and
    wherein by turning said screw member, the distance between said first and second support portions can be adjusted, wherein this causes an axis of said second end of said assembly to be moved in relation to an axis of said first end of said assembly.

8. In a tool holder having an attaching portion disposed on a basal side of a shaft and to be attached to a rotary part of a working machine, and a tool holding portion disposed in a tip end of said shaft, the outer peripheral portion of said shaft having first and second contact portions set in positions separated from each other in the longitudinal direction of said shaft, the improvement comprising:
    runout correcting means disposed in three or more uniform positions in a circumferential direction of the outer peripheral portion of said shaft, between said contact portions, generating a force by rotating a screw member disposed between said contact portions, said force causing an axis of said tip end side of said shaft to be displaced by bending in relation to the basal side end of said shaft.

9. In a tool holder having an attaching portion disposed on a basal side of a shaft and to be attached to a rotary part of a working machine, and a tool holding portion disposed in a tip end of said shaft, the outer peripheral portion of said shaft having first and second contact portions set in positions separated from each other in the longitudinal direction of said shaft, the improvement comprising:
    runout correcting means between said contact portions, comprising an abutting member having first and second abutting portions adapted to abut against said first and second contact portions, respectively, wherein a screw member causes said first and second abutting portions of said abutting member to abut respectively against said first and second contact portions, thereby generating a force bending the axis of the tip side of said shaft between said contact portions by rotating said screw member between said contact portions, said force causing an axis of said tip end side of said shaft to be displaced by bending in relation to the basal side end of said shaft.

10. In a tool holder having an attaching portion disposed on a basal side of a shaft and to be attached to a rotary part of a working machine, and a tool holding portion disposed in a tip end of said shaft, the outer peripheral portion of said shaft having first and second contact portions set in positions separated from each other in the longitudinal direction of said shaft, the improvement comprising:

runout correcting means between said contact portions comprising a female screw portion disposed in at least one of said first and second contact portions, wherein one said of said screw member is engaged with said female screw portion and another side of said screw member operatively engages another one of said first and second contact portions, generating a force by rotating said screw member disposed between said contact portions, said force causing an axis of said tip end side of said shaft to be displaced by bending in relation to the basal side end of said shaft.

11. In a tool holder having an attaching portion disposed on a basal side of a shaft and to be attached to a rotary part of a working machine, and a tool holding portion disposed in a tip end of said shaft, the outer peripheral portion of said shaft having first and second contact portions set in positions separated from each other in the longitudinal direction of said shaft, the improvement comprising:

runout correcting means between said contact portions, comprising an abutting member having an abutting portion adapted to abut against one of said first and second contact portions, and a tip end of another abutting portion abuts against another of said first and second contact portions, wherein said force of bending said axis of said tip end side of said shaft is generated between said contact portions by rotating said screw member inside a tapped hole formed in said abutting member, said force causing an axis of said tip end side of said shaft to be displaced by bending in relation to the basal side end of said shaft.

* * * * *